US008149935B2

(12) United States Patent
Adachi

(10) Patent No.: US 8,149,935 B2
(45) Date of Patent: Apr. 3, 2012

(54) DIGITAL BROADCAST RECEIVER AND DIGITAL BROADCAST RECEIVING APPARATUS

(75) Inventor: Naoto Adachi, Kawasaki (JP)

(73) Assignee: Fujitsu Semiconductor Limited, Yokohama (JP)

( * ) Notice: Subject to any disclaimer, the term of this patent is extended or adjusted under 35 U.S.C. 154(b) by 688 days.

(21) Appl. No.: 12/346,491

(22) Filed: Dec. 30, 2008

(65) Prior Publication Data

US 2009/0285318 A1 Nov. 19, 2009

(30) Foreign Application Priority Data

May 15, 2008 (JP) ................................ 2008-128465

(51) Int. Cl.
*H04L 27/28* (2006.01)

(52) U.S. Cl. ...................................................... 375/260

(58) Field of Classification Search .................. 375/260, 375/343, 346; 370/210; 386/83, 46, 68, 386/69; 725/88, 102

See application file for complete search history.

(56) References Cited

U.S. PATENT DOCUMENTS

| | | | | |
|---|---|---|---|---|
| 6,973,118 | B1 * | 12/2005 | Ikeda et al. | 375/146 |
| 7,346,074 | B2 | 3/2008 | Moon et al. | |
| 7,835,475 | B2 * | 11/2010 | Adachi | 375/343 |
| 7,912,136 | B2 * | 3/2011 | Adachi | 375/260 |
| 2004/0066843 | A1 | 4/2004 | Moon et al. | |
| 2005/0226354 | A1 * | 10/2005 | Shin et al. | 375/346 |
| 2007/0061852 | A1 * | 3/2007 | Hagiwara | 725/88 |

FOREIGN PATENT DOCUMENTS

| | | | |
|---|---|---|---|
| JP | 2004-128988 | A | 4/2004 |
| JP | 2006-020128 | A | 1/2006 |
| JP | 2007-074092 | A | 3/2007 |

* cited by examiner

*Primary Examiner* — Sam K Ahn

(74) *Attorney, Agent, or Firm* — Arent Fox LLP

(57) ABSTRACT

An FFT unit generates a frequency-domain signal for one-segment broadcasting and a frequency-domain signal for full-segment broadcasting. Under a good reception environment, the frequency-domain signal for the full-segment broadcasting is extracted by a switching control unit and the transmitted data for the full-segment broadcasting are recovered. When the reception environment deteriorates, both the one-segment broadcasting and the full-segment broadcasting are temporary demodulated. After a delay time due to the demodulation process has passed, a reception mode is switched from the full-segment broadcasting to the one-segment broadcasting.

15 Claims, 11 Drawing Sheets

DIGITAL BROADCAST RECEIVER AND DIGITAL BROADCAST RECEIVING APPARATUS

CROSS-REFERENCE TO RELATED APPLICATION

This application is based upon and claims the benefit of priority of the prior Japanese Patent Application No. 2008-128465, filed on May 15, 2008, the entire contents of which are incorporated herein by reference.

FIELD

The present invention relates to a digital broadcast receiver and digital broadcast receiving method for receiving digital broadcast that uses OFDM. The present invention may be applied to, for example, a method of switching the layer from which data is to be received, in a digital broadcast receiver that can receive data from a plurality of hierarchical layers.

BACKGROUND

As a digital-signal transmission system, OFDM (Orthogonal Frequency Division Multiplexing) has been proposed in recent years. In the OFDM system, data is transmitted employing a plurality of carriers that are orthogonal to each other in the frequency domain. For this reason, an OFDM transmitter modulates a transmission signal using IFFT (Inverse Fast Fourier Transform), and an OFDM receiver demodulates the transmission signal using FFT (Fast Fourier Transform). Since the OFDM system has high frequency efficiency, its application to digital terrestrial broadcasts has been widely explored. In Japan, the digital terrestrial broadcasting system called ISDB-T (Integrated Services Digital Broadcasting-Terrestrial) has adopted the OFDM.

FIG. 1 is a diagram illustrating the basic configuration of a general OFDM receiver. In FIG. 1, an OFDM signal received via an antenna is provided to a tuner 1. The tuner 1 selects a signal in a desired channel from the received signal. An A/D conversion unit 2 converts the signal selected by the tuner 1 into a digital signal. The digital signal is converted into a complex baseband signal by an orthogonal demodulation unit 3. The complex baseband signal is converted into a frequency-domain signal by an FFT unit 4. As a result, a plurality of signals transmitted using a plurality of carriers having different frequencies are obtained. An OFDM signal for digital broadcasting contains, for example, a data signal, a scattered pilot (SP) signal, an auxiliary channel (AC) signal, and a transmission and multiplexing configuration control (TMCC) signal.

The data signal and SP signal are provided to the transmission path equalization unit 5. The SP signal is a known signal for which the transmission phase and transmission power have been determined in advance. The transmission path equalization unit 5 equalizes the data signal using the SP signal. A deinterleave unit 6 performs a deinterleave process for the output data from the transmission path equalization unit 5. The recovered data are output in the transform stream (TS) format after a correction process is performed by an error correction unit 7.

In Japan, digital TV broadcast (13ch-62ch) using the UHF band and digital radio broadcast (7ch, 8ch) are specified as the digital terrestrial broadcast (ISDB-T). For the digital TV broadcast, a 6 MHz band is assigned to each channel, and each of the bands is further divided into 13 segments. Broadcasting for a general TV set (fixed terminal) is performed using 12 segments of the 13 segments (the broadcasting is sometimes called "full-segment broadcasting"), and broadcasting using the remaining one segment (the broadcasting is generally called "one-segment broadcasting") is performed for a mobile terminal.

A transmitting station multiplexes and transmits an A-layer TS for the one-segment broadcasting and a B-layer TS for the full-segment broadcasting simultaneously. At this time, the same contents are distributed with the one-segment broadcasting and the full-segment broadcasting (although the amount of information is different between the two types of broadcasting). In other words, simultaneous broadcasting is carried out. A digital broadcast receiver usually receives either one of the one-segment broadcasting and the full-segment broadcasting.

However, a receiver that can receive both the one-segment broadcasting and the full-segment broadcasting has been implemented. Such a receiver is equipped with, as illustrated in FIG. 2, an output layer selecting unit 8 for selecting one of A-layer TS and B-layer TS in accordance with the bit error rate (BER) of received data.

A system has been known as a related art, in which a signal in a partial layer is multiplexed into a plurality of segments and transmitted. According to this system, the signal is received by selection diversity with which the segment having the best reception state is selected from the plurality of segments in which the signal of the partial layer is multiplexed, or by combining diversity with which the signals in the multiplexed segments of the signal in the partial layer are combined.

As another related art, a digital broadcast receiving apparatus that can receive both the 12-segment broadcasting and one-segment broadcasting simultaneously and selectively has been known. The digital broadcast receiving apparatus includes a display switching unit that selectively switches and outputs, a first video image obtained by a 12-segment video image decoding unit and a second video image obtained by a one-segment video image decoding unit to a first display unit and a second display unit, respectively.

Further, a communication system has been known as another related art, in which required data can be selected from hierarchized transmitted data in accordance with the reception state. A receiving apparatus in the system include an information layer decision unit that decides the layer in the hierarchy to which the data transmitted from a transmission apparatus belongs to. A hierarchized data receiving unit receives the data in the layer decided by the information layer decision unit while limiting or selecting the data in accordance with the reception capacity or the propagation environment.

These arts are disclosed in, for example, Japanese Patent Application Publications No. 2006-20128, No. 2007-74092, and No. 2004-128988.

In the conventional arts, the video image is interrupted when the receiver switches between the one-segment broadcasting and the full-segment broadcasting. In addition, in a receiver that switches between one-segment/full-segment in accordance with the error rate of received data, a temporary deterioration in the error rate can trigger the switching process under fading or multipath environment, causing frequent occurrence of unnecessary switching processes.

Therefore, there has been a need for developing a receiver and receiving method with which switching between a plurality of hierarchical layers in digital broadcast can be performed seamlessly.

SUMMARY

According to one aspect of the embodiment, a digital broadcast receiver that receives digital broadcast through which first data and second data are transmitted using OFDM, including an FFT unit performing an FFT process for a received signal to generate a first frequency-domain signal corresponding to the first data and a second frequency-domain signal corresponding to the second data; a detection unit detecting a reception environment; a mode switching unit selecting, in accordance with the reception environment detected by the detection unit, a first reception mode for recovering the first data or a second reception mode for recovering the second data; an extraction unit extracting the first frequency-domain signal from an output signal of the FFT unit in the first reception mode, extracting the second frequency-domain signal from the output signal of the FFT unit in the second reception mode, and extracting the first and second frequency-domain signals from the output signal of the FFT unit when the reception mode is switched; a recovery unit recovering the first data from the first frequency-domain signal extracted by the extraction unit in the first reception mode, recovering the second data from the second frequency-domain signal extracted by the extraction unit in the second reception mode, and recovering the first and second data from the first and second frequency-domain signals extracted by the extraction unit when the reception mode is switched; and an output unit outputting the first data or the second data in accordance with an instruction from the mode switching unit.

Additional objects and advantages of the embodiment will be set forth in part in the description which follows, and in part will be obvious from the description, or may be learned by practice of the embodiment. The object and advantages of the embodiment will be realized and attained by means of the elements and combinations particularly pointed out in the appended claims.

It is to be understood that both the foregoing general description and the following detailed description are exemplary and explanatory only and are not restrictive of the embodiment, as claimed.

DESCRIPTION OF EMBODIMENTS

Figure 1:
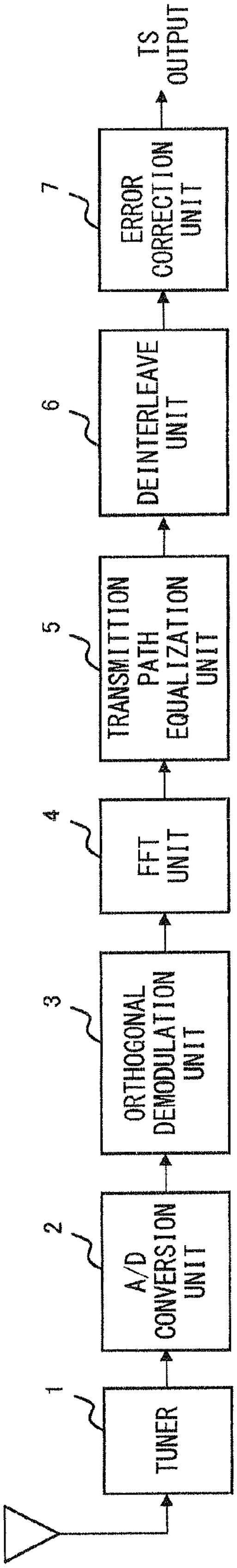
FIG. 1 is a diagram illustrating the basic configuration of a general OFDM receiver.
Figure 2:
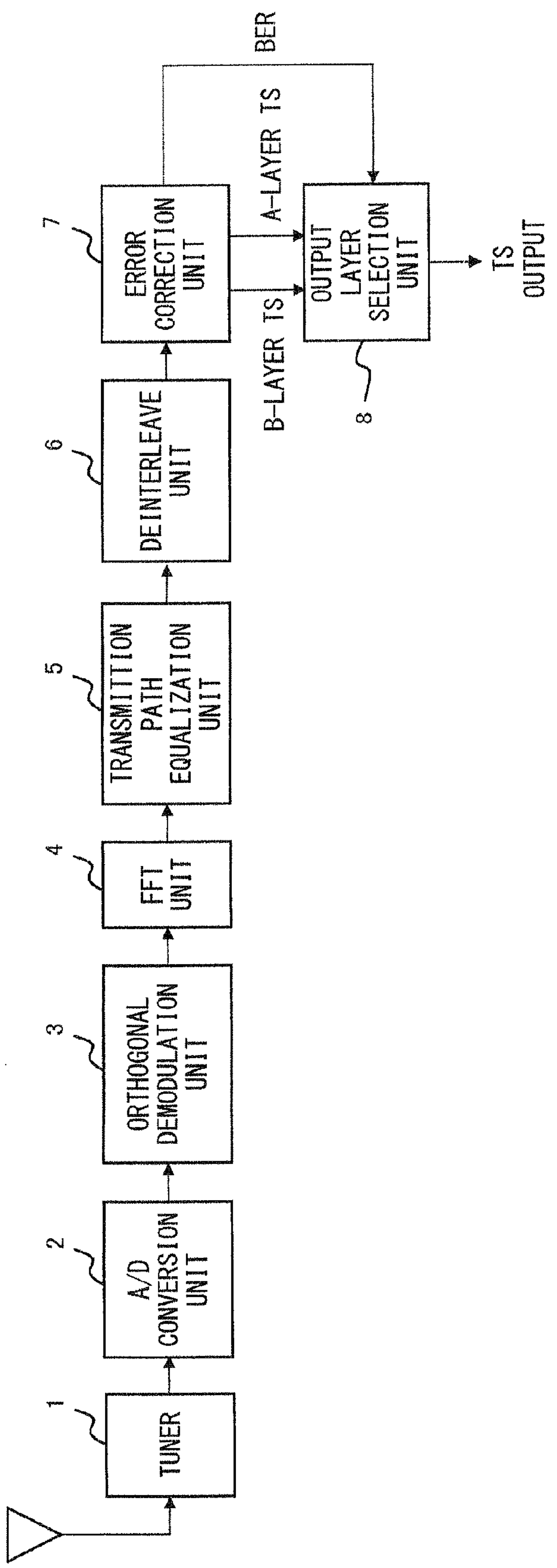
FIG. 2 is a diagram illustrating the configuration of a receiver that can receive both one-segment broadcasting and full-segment broadcasting.
Figure 3:
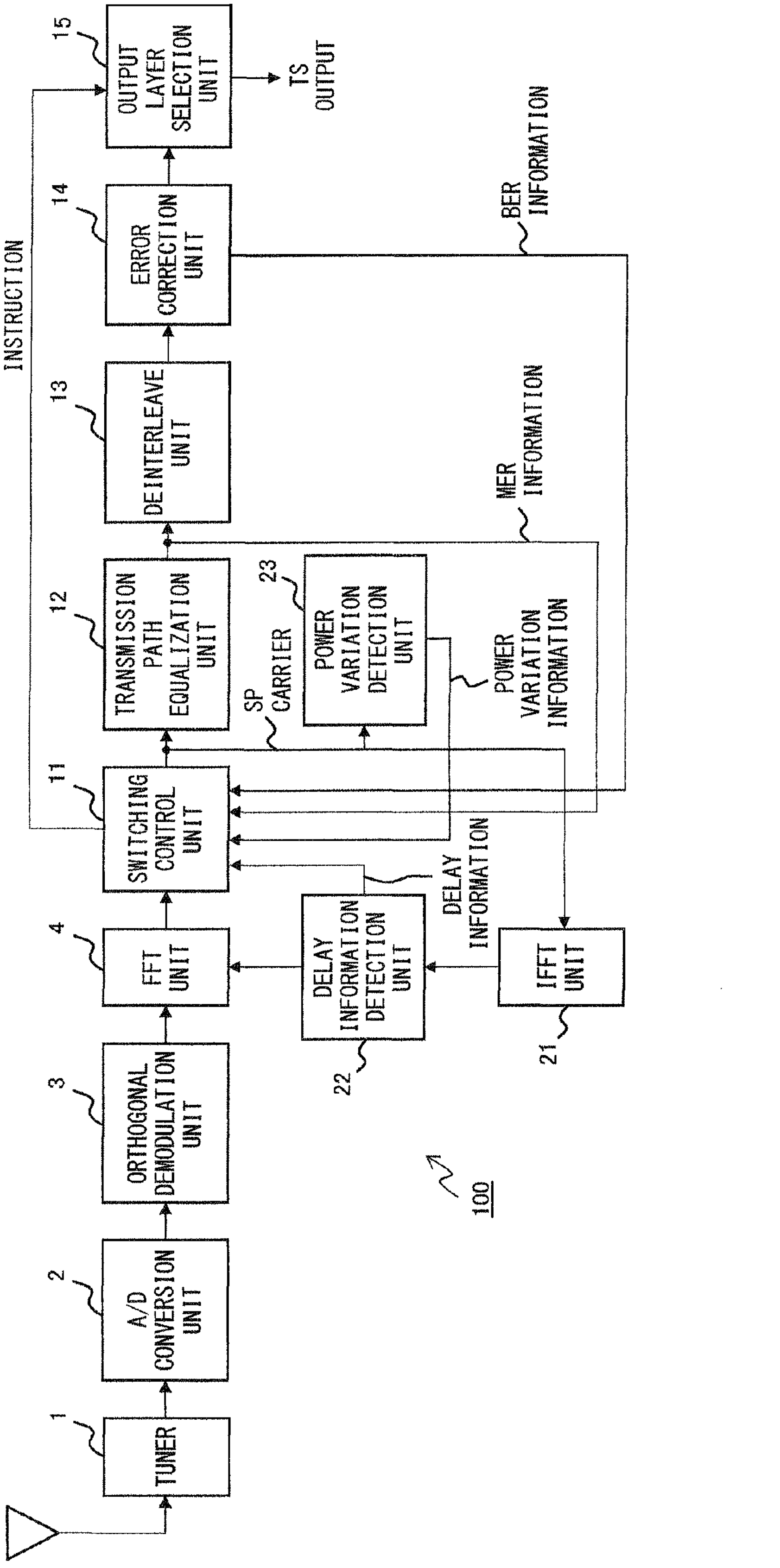
FIG. 3 is a diagram illustrating the configuration of a digital broadcast receiver according to an embodiment.

FIG. 3 is a diagram illustrating a digital broadcast receiver according to an embodiment. A broadcast receiver 100 in this embodiment is supposed to receive the digital terrestrial broadcast (ISDB-T) in Japan. According to ISDB-T, a 6 MHz band is assigned to each channel, and the band is further divided into 13 segments. Broadcasting for a general TV set (fixed terminal) is performed using 12 segments of the 13 segments (the broadcasting is sometimes called "full-segment broadcasting"), and broadcasting using the remaining one segment (the broadcasting is generally called "one-segment broadcasting") is performed for a mobile terminal such as a cellular phone. In this embodiment, it is assumed that the same contents are distributed by the one-segment broadcasting and the full-segment broadcasting. That is, simultaneous broadcasting is performed for each channel.

ISDB-T uses OFDM to transmit a signal. With OFDM, a plurality of signals can be transmitted in parallel using a plurality of carriers having different frequencies from each other. The plurality of carriers are used to transmit data, a scattered pilot (SP) signal, an auxiliary channel (AC) signal, a transmission and multiplexing configuration control (TMCC) signal, and so on.

In addition, according to ISDB-T, an interleave process is performed at the transmitting station. In the interleave (time interleave) process, data within a predetermined time frame are rearranged in accordance with a predetermined algorithm. Meanwhile, a deinterleave process corresponding to the interleave process at the transmitting station is performed at the receiving station.

Figure 4:
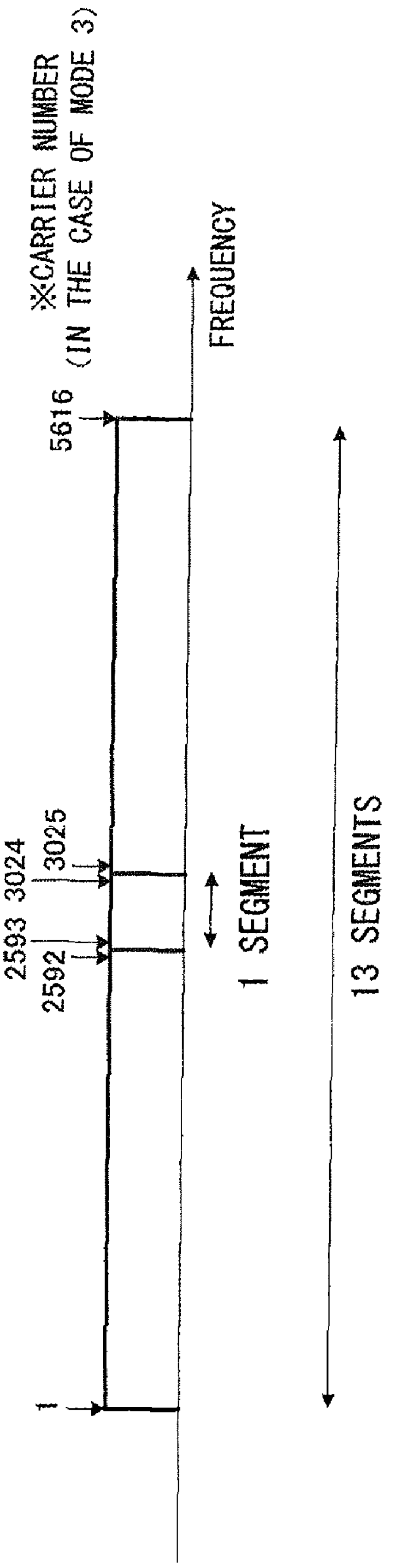
FIG. 4 is a diagram illustrating the configuration of the band in each channel.

In FIG. 3, an OFDM signal received via an antenna is provided to a tuner 1. The tuner 1 selects a signal in a desired channel from the received signal. Here, in ISDB-T, a 6 MHz band is assigned to each channel. Each channel contains 13 segments as illustrated in FIG. 4. In Mode 3 of ISDB-T, 432 carriers having different wavelengths from each other are assigned to each segment. In other words, 5616 carriers having different wavelengths from each other are assigned to each channel. In this embodiment, carriers 2593-3024 are assigned to the one-segment broadcasting, and carriers 1-2592, 3025-5616 are assigned to the full-segment broadcasting.

The signal selected by the tuner 1 is converted into an intermediate-frequency (IF) signal. An A/D conversion unit 2 converts an output signal from the tuner 1 into a digital signal. The digital signal is converted into a complex baseband signal by an orthogonal modulation unit 3. The complex baseband signal is a time-domain signal. The complex baseband signal is converted into a frequency-domain signal by an FFT unit 4, generating a signal for each carrier. Specifically, for example, data D1-D5616 respectively transmitted by carriers 1-5616 are sequentially output.

A switching control unit 11 selects a mode to receive the one-segment broadcasting or a mode to receive the full-segment broadcasting according to reception environment. At least one of delay information, power variation information, bit error rate (BER), and modulation error ratio (MER) is referred to as the reception environment. The switching control unit 11 then selects corresponding frequency-domain signals. That is, when the switching control unit selects the one-segment broadcasting, it extracts the data in the carriers that belong to the segment assigned to the one-segment broadcasting. The data signal, SP signal, AC signal, TMCC signal and the like for the one-segment broadcasting are obtained in this case. Meanwhile, when the switching control unit 11 selects the full-segment broadcasting, it extracts data in the carriers that belong to the segments assigned to the full-segment broadcasting. The data signal, SP signal, AC signal, TMCC signal and the like for the full-segment broadcasting are obtained in this case.

Figure 5A:
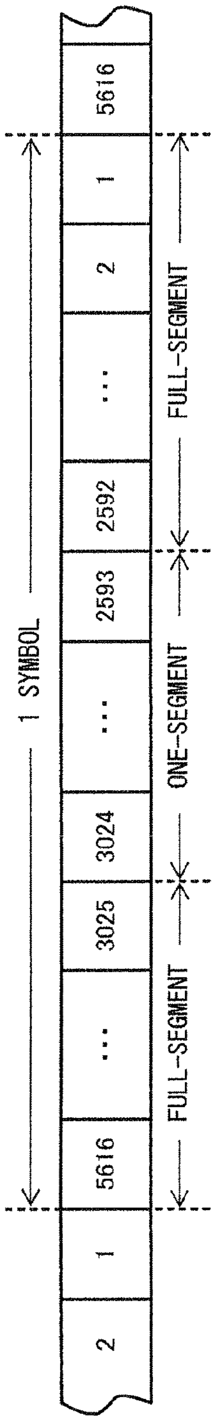
FIGS. 5A-5C are diagrams illustrating the extraction operation performed by a switching control unit.
Figure 5B:
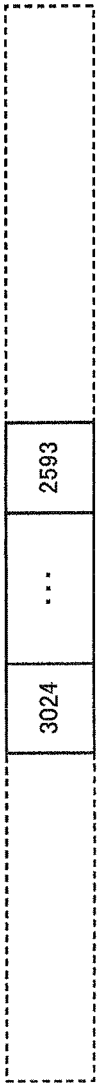
Figure 5C:
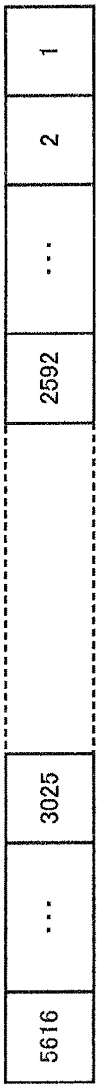

FIGS. 5A-5C are diagrams illustrating the extraction operation performed by the switching control unit. FIG. 5A represents an output signal from the FFT unit 4. As illustrated, the FFT unit 4 outputs data D1-D5616 of the respective carriers for each symbol. Then, when receiving the one-segment broadcasting, D2593-D3024 are extracted for each symbol, as illustrated in FIG. 5B. When receiving the full-segment broadcasting, D1-D2592, D3024-D5616 are extracted for each symbol, as illustrated in FIG. 5C. As described in detail later, at the time of switching the reception modes, the switching control unit 11 extracts all D1-D5616 for each symbol.

The signals (data signal, SP signal, and the like) extracted by the switching control unit 11 are provided to a transmission path equalization unit 12. The SP signal is a known signal for which the transmission phase and transmission power have been determined in advance, and used for synchronous detection and estimation of the transmission path. The transmission path equalization unit 12 then performs equalization of the data signal using the SP signal. The "equalization" includes a process to correct phase rotation occurring in the transmission path. The data stream obtained by the transmission path equalization unit 12 is demodulated. The demodulation process includes a deinterleave process.

A deinterleave unit 13 performs the deinterleave process for the data stream obtained by the transmission path equalization unit 12. The deinterleave process involves inverse conversion of the interleave process that is performed at the transmitting station, in which a data stream in a predetermined time frame is rearranged in accordance with a predetermined algorithm. The predetermined time frame corresponds to, for example, one frame time under the condition of interleave parameter I=2 (Mode 3), and corresponds to two frame times under the condition of interleave parameter I=4 (Mode 3). One frame time is about 200 milliseconds. Accordingly, the deinterleave unit 13 has a buffer to store data in the predetermined time frame, and rearranges and outputs the data stream stored in the buffer. For this reason, a delay corresponding to the time frame occurs in the deinterleave process. The delay time is about 200 milliseconds under the condition of I=2 (Mode 3), and is about 400 milliseconds under the condition of I=4 (Mode 3).

A de-mapping process is performed for the demodulated data to convert the data into binary data having one bit or a plurality of bits. The transmitted data are recovered by the process. The recovered transmitted data is output in the transform stream (TS) format, after a correction process is performed by an error correction unit 14. An output layer selection unit 15 passes the transmitted data output from the error correction unit 14 unchanged during the normal time. On the other hand, when the reception mode is switched, the output layer selection unit 15 selects and outputs a corresponding data stream in accordance with a switching instruction provided by the switching control unit 11.

An IFFT unit 21 performs inverse Fourier transformation for the SP signal contained in the output signal from the FFT unit 4. A time-domain signal for the SP is obtained by the IFFT. A delay information detection unit 22 generates a delay profile using the time-domain signal output from the IFFT unit 21. The delay profile represents the reception power on the time axis. In other words, the delay profile represents the reception power of the main wave (desired wave) and the interference wave (undesired wave). Therefore, the delay time due to multipath can be detected by analyzing the delay profile. The delay information representing the delay time due to multipath is provided to the switching control unit 11. The delay information is also used to control the position of the FFT window in the FFT unit 4.

A power variation detection unit 23 detects fading using the SP signal contained in the output signal from the FFT unit 4. The power variation detection unit 23 notifies the switching control unit 11 of power variation information that indicates the detected fading.

Meanwhile, BER information and MER information are provided to the switching control unit 11 in addition to the delay information and power variation information. The BER information represents the bit error rate of received data, which is detected at the error correction unit 14. The MER information represents the modulation error ratio of received data, which is detected from output data of the transmission path equalization unit 12.

The digital broadcast receiver 100 configured as described above selectively receives the one-segment broadcasting or the full-segment broadcasting in accordance with the reception environment. The reception environment is determined on the basis of at least one of delay information, power variation information, BER information and MER information. The modulation method used for the one-segment broadcasting is, for example, QPSK, and the modulation method used for the full-segment broadcasting is, for example, 64 QAM. In this case, the full-segment broadcasting has higher data-transmission efficiency but has lower noise resistance, compared to the one-segment broadcasting.

Therefore, under a good reception environment, the digital broadcast receiver 100 receives the full-segment broadcasting. In this case, the switching control unit 11 extracts data that belong to the 12 segments assigned to the full-segment broadcasting. In this embodiment, the data obtained from carriers 1-2592, 3025-5616 are extracted, as illustrated in FIG. 5C. Then, the transmission path equalization unit 12, deinterleave unit 13, and the error correction unit 14 process the full-segment broadcasting data only. The full-segment broadcasting data are output in the TS format accordingly. On the other hand, under a bad reception environment, the digital broadcast receiver 100 receives the one-segment broadcasting. In this case, the switching control unit 11 extracts data that belong to the segment assigned to the one-segment broadcasting. In this embodiment, the data obtained from carriers 2593-3024 are extracted, as illustrated in FIG. 5B. Then, the transmission path equalization unit 12, deinterleave unit 13, and the error correction unit 14 process the one-segment broadcasting data only. The one-segment broadcasting data are output in the TS format accordingly.

Meanwhile, the digital broadcast receiver 100 is a mobile terminal, although it is not a limitation. As an example, the digital broadcast receiver 100 is a car navigation apparatus that is installed in a car and the like, and receives map information, traffic information and the like. In this case, since more information can be received with the full-segment broadcasting, detail map information and traffic information are displayed when receiving the full-segment broadcasting. On the other hand, the amount of information transmitted through the one-segment broadcasting is small, simple information is displayed when receiving the one-segment broadcasting.

Figure 6:
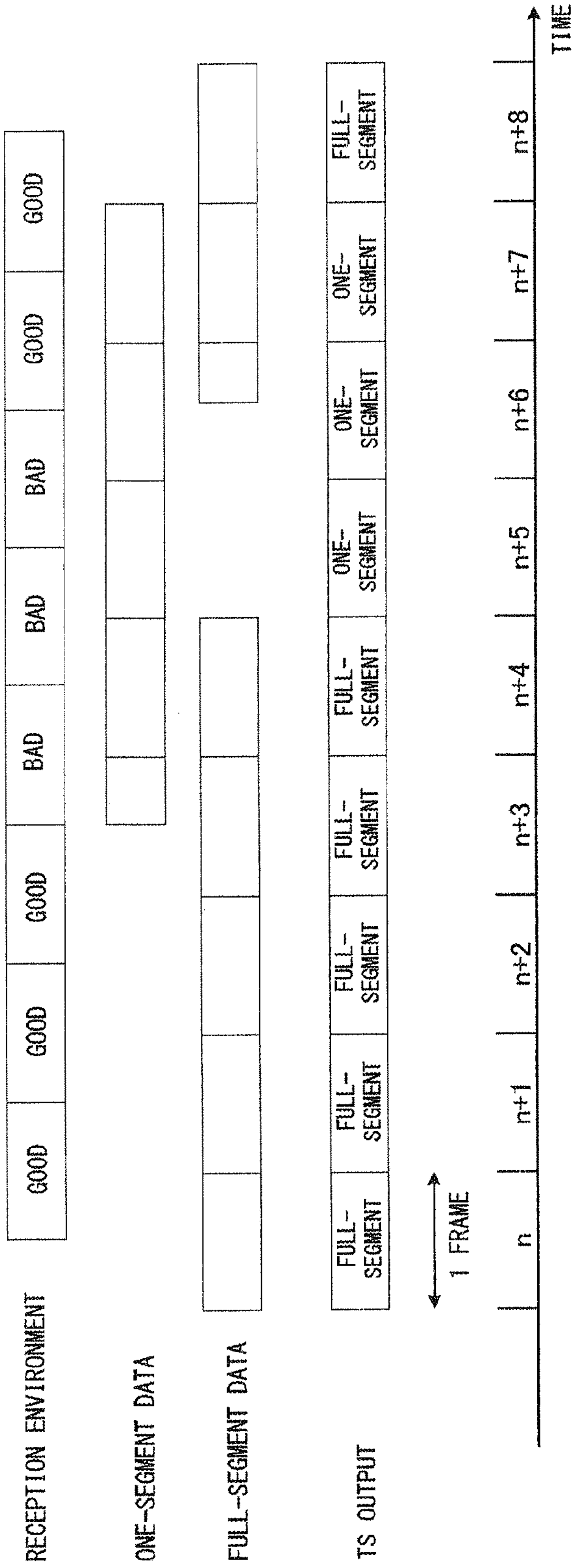
FIG. 6 is a diagram illustrating the reception mode switching method.

FIG. 6 is a diagram illustrating the reception mode switching method for the digital broadcast receiver 100 according to the embodiment. In this example, the interleave parameter I=2 (Mode 3) is assumed for both the one-segment broadcasting and the full-segment broadcasting. In other words, the delay due to the deinterleave process is supposed to correspond to one frame time for both the one-segment broadcasting and the full-segment broadcasting.

In FIG. 6, the reception environment is supposed to be good in the time slots n through n+2. During this period, the digital broadcast receiver 100 receives the full-segment broadcasting. Accordingly, the switching control unit 11 extracts data from the carriers 1-2592, 3025-5616 that are assigned to the full-segment broadcasting. As a result, the B-layer data (full-segment broadcasting data) are output in the TS format.

It is assumed that the reception environment deteriorates during the reception of the full-segment broadcasting in the time slot n+3. Then, the digital broadcast receiver 100 starts the sequence for switching the reception modes (from full-segment mode to one-segment mode). Accordingly, the switching control unit 11 extracts both the full-segment broadcasting data and the one-segment broadcasting data in the time slot n+4. In other words, both the data obtained from the carriers 2593-3024 assigned to the one-segment broadcasting and the data obtained from the carriers 1-2592, 3025-5616 assigned to the full-segment broadcasting are extracted. At this time, the transmission path equalization unit 12 equalizes the full-segment broadcasting data and the one-segment broadcasting data, and the deinterleave unit 13 performs the deinterleave process for the full-segment broadcasting data and the one-segment broadcasting data. Accordingly, both the A-layer data (one-segment broadcasting data) and the B-layer data (full-segment broadcasting data) are provided to the output layer selection unit 15. The output layer selection unit 15 then selects and outputs the B-layer data.

Next, in the time slot n+5, the switching control unit 11 extracts the one-segment broadcasting data. That is, only the data obtained from the carriers 2593-3024 are extracted. As a result, the A-layer data (one-segment broadcasting data) are output in the TS format.

It is assumed that the reception environment improves during the reception of the one-segment broadcasting in the time slot n+6. Then, the digital broadcasting receiver 100 starts the sequence for switching the reception modes (from one-segment mode to full-segment mode). Accordingly, the switching control unit 11 extracts both the full-segment broadcasting data and the one-segment broadcasting data in the time slot n+7. In other words, the data obtained from the carriers 2593-3024 and the data obtained from the carriers 1-2592, 3025-5616 are extracted. At this time, in the same manner as in the time slot n+4, the transmission path equalization unit 12 equalizes the full-segment broadcasting data and the one-segment broadcasting data, and the deinterleave unit 13 performs the deinterleave process for the full-segment broadcasting data and the one-segment broadcasting data. Accordingly, the A-layer data and the B-layer data are provided to the output layer selection unit 15. However, in the time slot n+7, the output layer selection unit 15 outputs the A-layer data (one-segment broadcasting data).

Next, in the time slot n+8, the switching control unit 11 extracts the full-segment broadcasting data. In other words, the data obtained from the carriers 1-2592, 3025-5616 are extracted. As a result, the B-layer data (full-segment broadcasting data) is output from the TS format.

Thus, in the digital broadcast reception method according to the embodiment, both the one-segment broadcasting data and the full-segment broadcasting data are received temporally, when switching the reception modes. The period during which both data are received corresponds to the delay time due to the demodulation process (one frame time in the example illustrated in FIG. 6). However, the period during which both data are received may be longer than the delay time with the demodulation process, in order to secure some margins.

The period for detecting the reception environment is one frame time in this example, although it is not a limitation. The detection accuracy increases when a longer period is taken for detecting the reception environment. On the other hand, the response speed for the mode switching increases when a shorter period is taken for detecting the reception environment. Therefore, it is preferable to determine the period for detecting the reception environment appropriately, in consideration of these factors.

Figure 7:
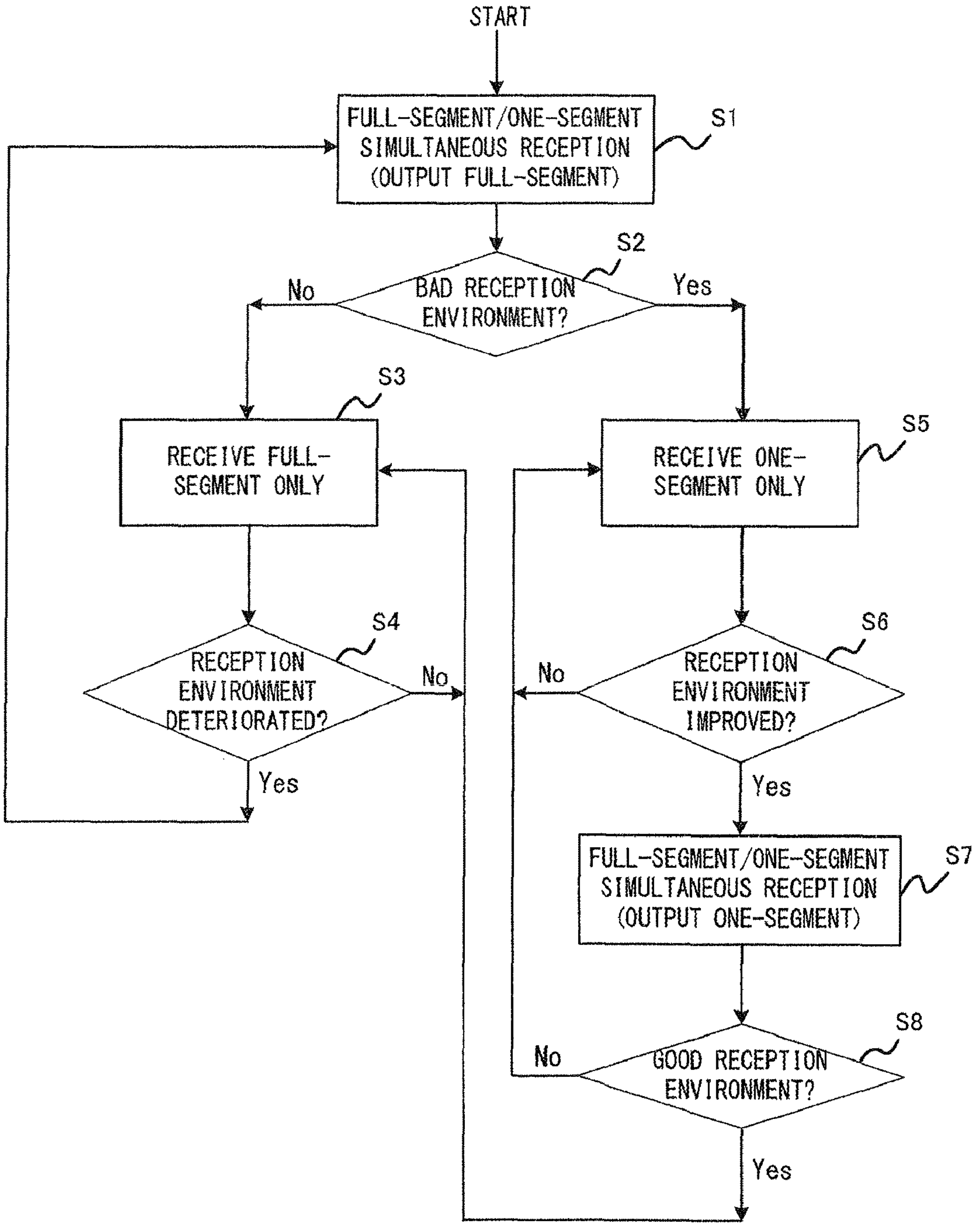
FIG. 7 is a flowchart illustrating the reception mode switching method.

FIG. 7 is a flowchart illustrating the reception mode switching method. The processes in the flowchart are performed by the switching control unit 11.

At the start of reception, both the one-segment broadcasting and the full-segment broadcasting are received in step S1. The one-segment broadcasting data and the full-segment broadcasting data are recovered accordingly. Then, an instruction for selecting the full-segment broadcasting data is provided to the output layer selection unit 15. As a result, the full-segment broadcasting data are output.

In step S2, the reception environment is checked while receiving the one-segment broadcasting and the full-segment broadcasting. If the reception environment is good, the process proceeds to step S3. In the step S3, only the full-segment broadcasting is received. In step S4, the reception environment is checked while receiving the full-segment broadcasting. Then, the operation receiving only the full-segment broadcasting is continued during the period in which the reception environment is good. On the other hand, when the reception environment deteriorates, the process returns to step S1, where both the one-segment broadcasting and the full-segment broadcasting are received.

When the reception environment is determined to be bad in the step S2, the process proceeds to step S5. Only the one-segment broadcasting is received in the step S5. In step S6, the reception environment is checked while receiving the one-segment broadcasting. Then, the operation receiving only the one-segment broadcasting is continued during the period in which the reception environment remains bad. On the other hand, when the reception environment improves during the reception of the one-segment broadcasting, the process proceeds to step S7. As well as in step S1, both the one-segment broadcasting and the full-segment broadcasting are received in the step S7. However, the step S7 differs from the step S1 in that an instruction for selecting the one-segment broadcasting is provided to the output layer selection unit 15 in step S7. As a result, the one-segment broadcasting data are output.

In step S8, the reception environment is checked while receiving the one-segment broadcasting and the full-segment broadcasting. When the reception environment is good, the process proceeds to step S3, where the reception modes are switched and only the full-segment broadcasting is received after the switching. On the other hand, if the reception environment deteriorates, the process returns to step S5, where the reception modes remain unchanged and only the one-segment broadcasting is received.

As described above, in the reception method according to the embodiment, when the reception environment deteriorates while the full-segment broadcasting is received, both the one-segment broadcasting and the full-segment broadcasting are received (steps S3, S4, S1). However, if the deterioration of the reception environment is temporal, switching to the mode for receiving the one-segment broadcasting is not performed, and the mode returns to the one for receiving the full-segment broadcasting (steps S2, S3). In the same manner, when the reception environment improves while receiving the one-segment broadcasting, both the one-segment broadcasting and the full-segment broadcasting are received (steps S5,

S6, S7). However, if the improvement of the reception environment is temporal, switching to the mode for receiving the full-segment broadcasting is not performed, and the mode returns to the one for receiving the one-segment broadcasting (steps S8, S5). In other words, in the reception method according to the embodiment, a temporal change in the reception environment does not cause the switching of the reception modes, suppressing frequent switching of recovered and displayed images and preventing users from feeling uncomfortable.

Figure 8:
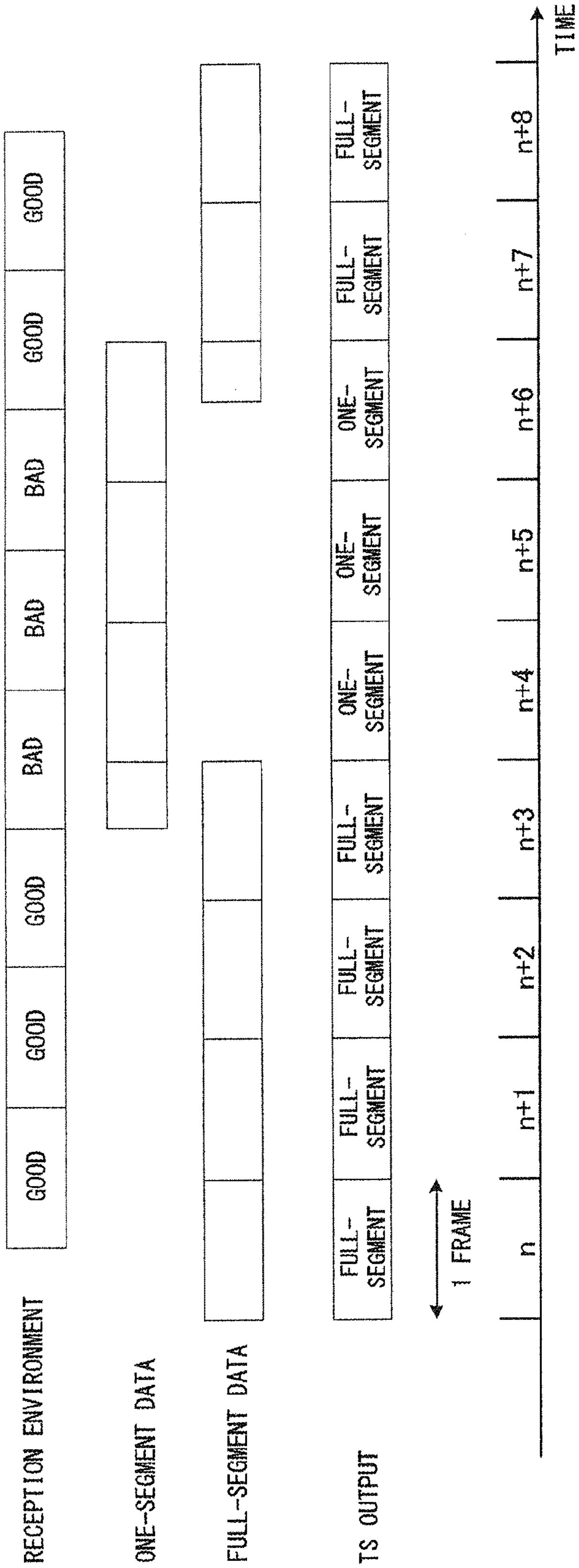
FIG. 8 is a diagram illustrating a sequence without simultaneous reception of one-segment broadcasting and full-segment broadcasting.

FIG. 8 is a diagram illustrating a sequence without simultaneous reception of one-segment broadcasting and full-segment broadcasting when switching the reception modes. In the example illustrated in FIG. 8, it is assumed that while receiving the full-segment broadcasting, the reception environment deteriorates in the time slot n+3. Then, reception of the full-segment broadcasting is stopped and reception of the one-segment broadcasting is started in the time slot n+4.

However, in this sequence, the demodulation process (mainly the deinterleave process) for the one-segment broadcasting data has not been completed even if an attempt to recover the one-segment broadcasting data is made in the time slot n+4. This causes distortion of the recovered image when switching from the full-segment broadcasting to the one-segment broadcasting. The problem also occurs when switching from the one-segment broadcasting and the full-segment broadcasting.

By contrast, in the digital broadcast receiver 100 according to the embodiment, a period for receiving both the one-segment broadcasting and the full-segment broadcasting simultaneously is provided when switching the reception modes, as illustrated in FIG. 6. That is, when switching from a first reception mode to a second reception mode, the required amount of data for demodulating the second reception mode are accumulated and the demodulation process is performed, in parallel with the data recovery for the first reception mode. When the delay time due to the demodulation in the second reception mode is absorbed, the data stream to be output is switched in units of frames. After that, the data for the second reception mode are output as the recovered data. Therefore, the switching between the one-segment broadcasting and the full-segment broadcasting is performed seamlessly.

Meanwhile, both the one-segment broadcasting data and the full-segment broadcasting data may be recovered constantly. According to this method, however, the transmission path equalization unit 12, deinterleave unit 13, the error correction unit 14 need to process data for all 13 segments constantly. By contrast, in the method according to the embodiment, the transmission path equalization unit 12, deinterleave unit 13, the error correction unit 14 processes only one of the one-segment broadcasting data and the full-segment broadcasting only except for the time of switching the reception modes. Accordingly, the power consumption can be reduced using the method according to the embodiment.

Figure 9:
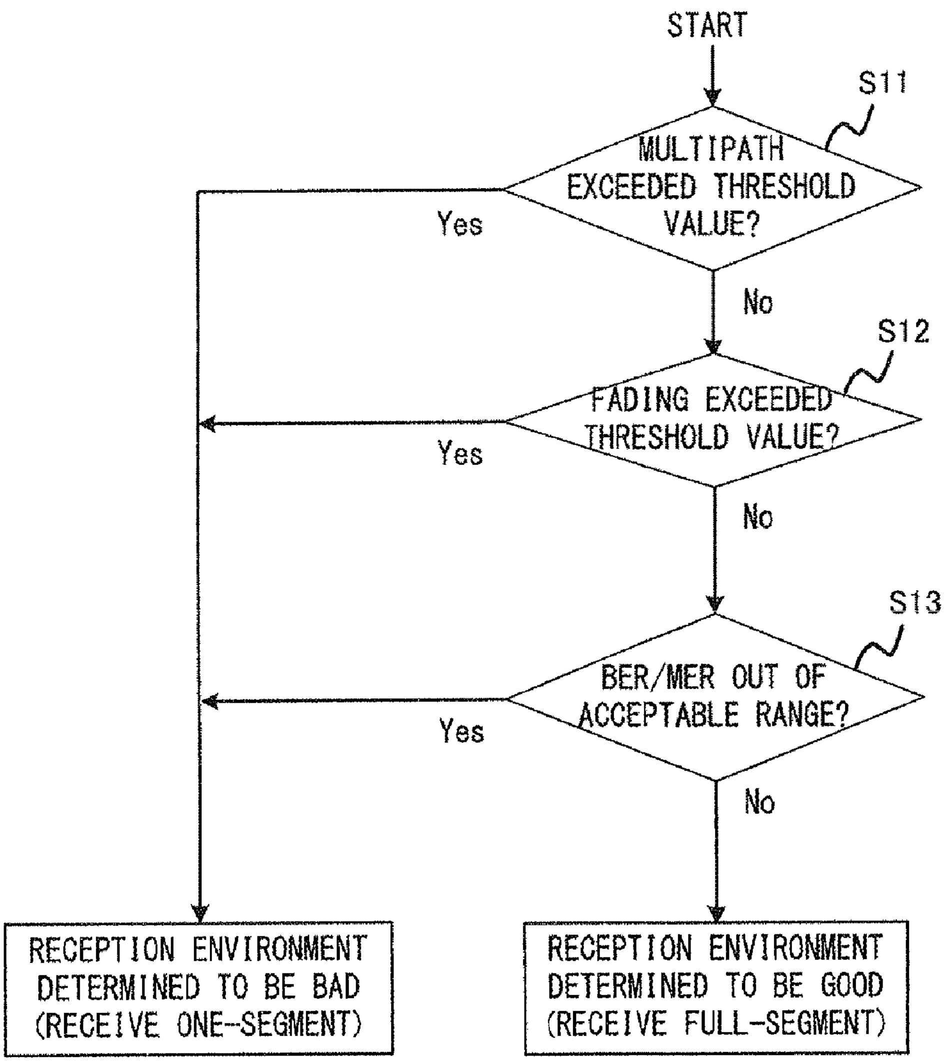
FIG. 9 is a flowchart illustrating processes for determining the reception environment.

FIG. 9 is a flowchart showing processes for determining the reception environment. Basically, the processes in the flowchart are performed repeatedly at a predetermined time interval. The processes correspond to the steps S2, S4, S6, S8 in FIG. 7.

Whether or not the delay due to multipath has exceeded a threshold value is checked in step S11. The delay due to multipath is detected by a delay information detection unit 22, and provided as delay information. The threshold value is determined appropriately by an experiment, simulation and the like. The threshold may also be set, for example, as the time corresponding to the guard interval of the OFDM signal, although it is not a limitation. In the case in which 64 QAM is adopted for the full-segment broadcasting, the data cannot be recovered when the multipath delay exceeds the guard interval. Therefore, in this case, the threshold may set to be smaller than the guard interval.

Whether or not fading (power variation) has exceeded a threshold value is checked in step S12. The fading is detected by a power variation detection unit 23, and provided as power-variation information. The threshold value is determined appropriately by an experiment, simulation and the like. The fading is caused by the movement of the receiving station (or transmitting station). The fading becomes larger as the receiving station moves faster.

Whether or not the BER and/or MER have exceeded an allowable range is checked in step S13. The BER and MER are detected using a known technique. The allowable range for the BER and MER is determined appropriately by, for example, an experiment, simulation and the like.

In this example, when one or more parameters exceed the threshold value (or the allowable range) in the steps S11-S13, the reception environment is determined to be bad. On the other hand, when all of the parameters are below the threshold values in the steps S11-S13, the reception environment is determined to be good.

Figure 10:
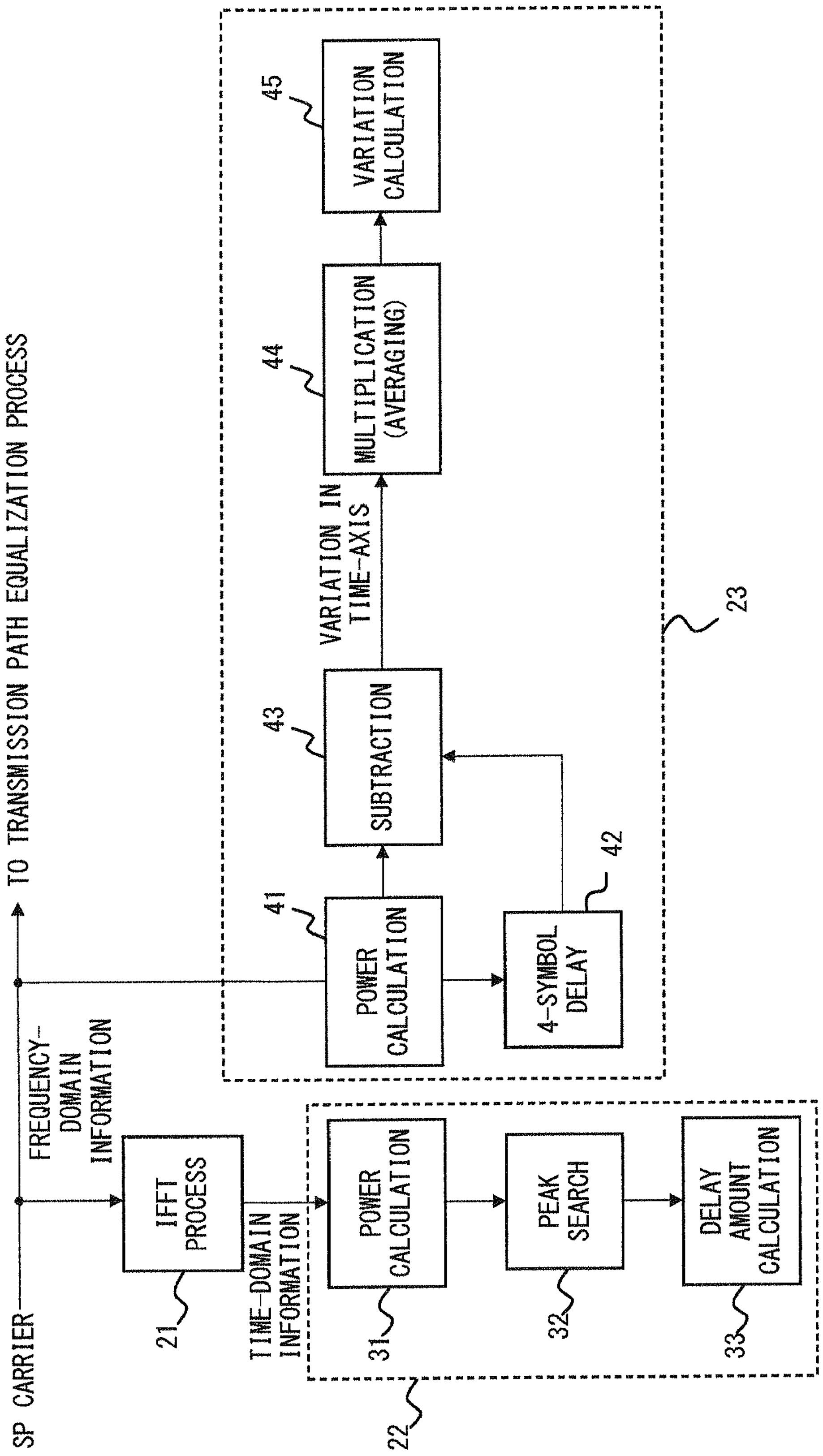
FIG. 10 is a diagram illustrating a method for detecting multipath and fading.
Figure 11:
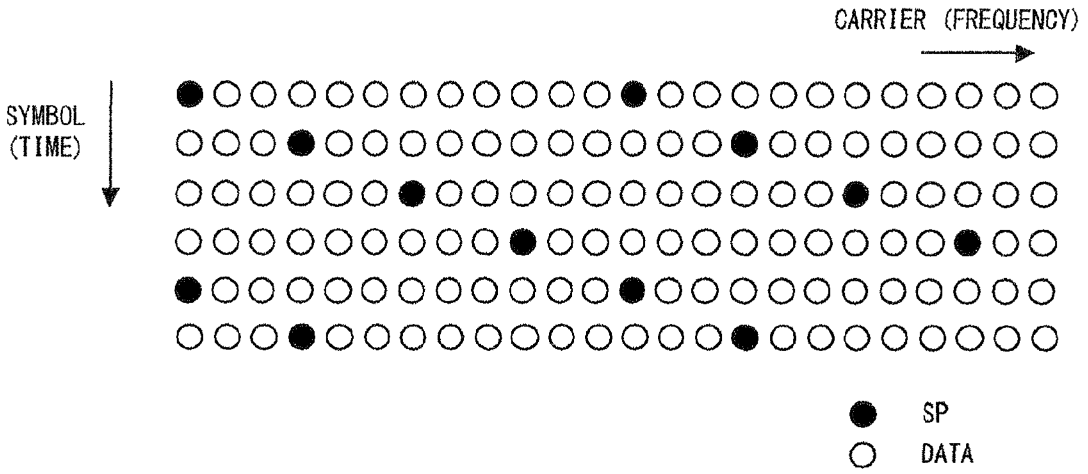
FIG. 11 is a diagram illustrating the arrangement of SP signals.

FIG. 10 is a diagram illustrating a method for detecting multipath and fading. In this example, the multipath and fading are detected using SP signals contained in the OFDM signal. As illustrated in FIG. 11, the SP signal is inserted for every 12 carriers in the frequency-axis direction. Each carrier is disposed at a 1 kHz interval in Mode 3 for the digital terrestrial broadcast, for example. Meanwhile, in the time-axis direction, the SP signal is inserted for every 4 symbols. One symbol time is, for example, 1.008 milliseconds.

In FIG. 10, the IFFT unit 21 performs inverse Fourier transformation for the SP signals. The time-domain signal for the SP is obtained accordingly. The delay information detection unit 22 includes a power calculation unit 31, a peak search unit 32, and a delay amount calculation unit 33. The power calculation unit 31 calculates the power of the time-domain signal obtained by the IFFT unit 21 and generates a delay profile. The peak search unit 32 searches for the power peak in the delay profile obtained by the power calculation unit 31. At this time, the peak having the largest power is determined as the desired wave. Other peaks are determined as undesired waves. The delay amount calculation unit 33 then calculates the time difference (that is, the multipath delay) between the desired wave and the undesired waves. The calculated multipath delay is informed to the switching control unit 11.

The power variation detection unit 23 includes a power calculation unit 41, a 4-symbol delay unit 42, a subtraction unit 43, a multiplication unit 44, and a variation calculation unit 45. The power calculation unit 41 calculates the power of each SP signal in the frequency domain. The SP signal is inserted at a 4-symbol interval in the time-axis direction. Therefore, the 4-symbol delay unit 42 holds power information obtained by the power calculation unit 41 for just 4 symbol time period, and then outputs it to the subtraction unit 43. The subtraction unit 43 calculates the difference between the power information provided from the power calculation unit 41 and the power information provided from the 4-symbol delay unit 42. The difference value represents the variation of the power of the SP signal on the time axis. The multiplication unit 44 calculates the average of the differences obtained by the subtraction unit 43. The averaging calculation may be performed both in the time direction and in the frequency direction, or for either one of the time direction and the frequency direction. The variation calculation unit 45 informs the average value obtained by the multiplication unit 44 as power variation information to the switching control unit 11. The power variation information may be converted into the movement speed of the receiving station (the digital broadcast receiver 100).

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. A digital broadcast receiver that receives digital broadcast through which first data and second data are transmitted using Orthogonal Frequency Division Multiplexing (OFDM), comprising a Fast Fourier Transform (FFT) unit performing an FFT process for a received signal to generate a first frequency-domain signal corresponding to the first data and a second frequency-domain signal corresponding to the second data;

a detection unit detecting a reception environment;

a mode switching unit selecting, in accordance with the reception environment detected by the detection unit, a first reception mode for recovering the first data or a second reception mode for recovering the second data;

an extraction unit extracting the first frequency-domain signal from an output signal of the FFT unit in the first reception mode, extracting the second frequency-domain signal from the output signal of the FFT unit in the second reception mode, and extracting the first and second frequency-domain signals from the output signal of the FFT unit when the reception mode is switched;

a recovery unit recovering the first data from the first frequency-domain signal extracted by the extraction unit in the first reception mode, recovering the second data from the second frequency-domain signal extracted by the extraction unit in the second reception mode, and recovering the first and second data from the first and second frequency-domain signals extracted by the extraction unit when the reception mode is switched; and an output unit outputting the first data or the second data in accordance with an instruction from the mode switching unit.

2. The digital broadcast receiver according to claim 1, wherein when the reception mode is switched from the first reception mode to the second reception mode, the output unit selects and outputs the first data.

3. The digital broadcast receiver according to claim 1, wherein the first data are one-segment broadcasting data, and the second data are full-segment broadcasting data.

4. The digital broadcast receiver according to claim 1, wherein the detection unit detects a multipath delay; and the mode switching unit selects the reception mode in accordance with the detected multipath delay.

5. The digital broadcast receiver according to claim 1, wherein the detection unit detects fading, and the mode switching unit selects the reception mode in accordance with the detected fading.

6. The digital broadcast receiver according to claim 1, wherein the detection unit detects a bit error rate or modulation error ratio, and the mode switching unit selects the reception mode in accordance with the detected bit error rate or modulation error ratio.

7. The digital broadcast receiver according to claim 1, wherein the recovery unit comprises a demodulation unit demodulating a frequency-domain signal; and the extraction unit extracts, when the reception mode is switched, both the first and second frequency-domain signals for a predetermined period of time determined on the basis of a delay time in the demodulation unit.

8. An Orthogonal Frequency Division Multiplexing (OFDM) receiver circuit that demodulates an OFDM signal containing 13 segments, one segment of the 13 segments being used for one-segment broadcasting and the other segments of the 13 segments being used for full-segment broadcasting, the OFDM receiver circuit comprising:

a Fourier transformation circuit performing Fourier transformation for the OFDM signal containing the 13 segments to convert a time-domain signal into a frequency-domain signal;

a switching control unit dividing the frequency-domain signal into a first signal in a band corresponding to the full-segment broadcasting and a second signal in a band corresponding to the one-segment broadcasting, and outputting the frequency-domain signal unchanged, or, either one of the first signal and the second signal; and a TS signal output circuit converting an output signal from the switching control unit into a transport stream (TS) signal and outputting the transport stream signal.

9. The OFDM receiver circuit according to claim 8, wherein the TS signal output circuit comprises:

a transmission path equalization unit removing an effect of noise and wave distortion from an output signal from the switching control unit;

a deinterleave unit holding, for a time corresponding to one frame, a signal with the effect of noise and wave distortion having been removed by the transmission path equalization unit;

an error correction unit performing error correction using an error correction code attached to the OFDM signal, for the OFDM signal with the effect of noise and wave distortion having been removed by the transmission path equalization unit and outputting a TS signal; and an output layer selection unit, to which the TS signal is input, selecting and outputting an A-layer TS signal or a B-layer TS signal contained in the TS signal.

10. The OFDM receiver circuit according to claim 9, further comprising:

an inverse Fourier transformation circuit performing inverse Fourier transformation to convert the frequency-domain signal obtained by the Fourier transformation circuit into a time-domain signal;

a delay information detection circuit generating, from the time-domain signal, a delay profile indicating a reception power on a time axis and calculating a delay time between a main wave and an interference wave; and a power variation detection circuit calculating an error signal representing a time-variation of transmission path characteristics of a pilot signal contained in the OFDM signal, wherein the switching control unit divides the frequency-domain signal into hierarchical layers to obtain the first signal in a band corresponding to the full-segment broadcasting and the second signal in a band corresponding to the one-segment broadcasting, on the basis of BER (bit error rate) information calculated by the error correction unit, the delay time calculated by the delay information detection circuit, the error signal calculated by the power variation detection circuit, and MER (modulation error ratio) information calculated by the transmission path equalization unit; and outputs the frequency-domain signal unchanged, or, either one of the first signal and the second signal, to the transmission path equalization unit.

11. A digital broadcast receiving method for receiving digital broadcast through which first data and second data are transmitted using Orthogonal Frequency Division Multiplexing (OFDM), comprising:

performing Fast Fourier Transform (FFT) for a received signal to generate a first frequency-domain signal corresponding to the first data and a second frequency-domain signal corresponding to the second data;

detecting a reception environment;

selecting, in accordance with the detected reception environment, a first reception mode for recovering the first data or a second reception mode for recovering the second data;

extracting the first frequency-domain signal from an output signal of the FFT in the first reception mode, the second frequency-domain signal from the output signal of the FFT in the second reception mode, and the first and second frequency-domain signals from the output signal of the FFT when the reception mode is switched;

recovering the first data from the extracted first frequency-domain signal in the first reception mode, the second data from the extracted second frequency-domain signal in the second reception mode, and the first and second data from the extracted first and second frequency-domain signals when the reception mode is switched; and outputting the first data or the second data in accordance with the selected reception mode.

12. The digital broadcast receiving method according to claim 11, wherein when a reception environment parameter falls below a threshold value in a period during which the first reception mode is selected, the reception mode is shifted to a transition mode in which the first data is output while the first and second data are recovered from the first and second frequency-domain signal;

a reception environment is detected in the transition mode; and the reception mode is returned to the first reception mode when the reception environment parameter detected in the transition mode exceeds the threshold value.

13. The digital broadcast receiving method according to claim 12, wherein the reception mode is shifted to the second reception mode when the reception environment parameter detected in the transition mode is lower than the threshold value.

14. The digital broadcast receiving method according to claim 11, wherein when a reception environment parameter exceeds a threshold value in a period during which the second reception mode is selected, the reception mode is shifted to a transition mode in which the second data is output while the first and second data are recovered from the first and second frequency-domain signal;

a reception environment is detected in the transition mode; and the reception mode is returned to the second reception mode when the reception environment parameter detected in the transition mode falls below the threshold value.

15. The digital broadcast receiving method according to claim 14, wherein the reception mode is shifted to the first reception mode when the reception environment parameter detected in the transition mode is higher than the threshold value.

* * * * *